(12) United States Patent
Zhang et al.

(10) Patent No.: US 12,260,853 B2
(45) Date of Patent: Mar. 25, 2025

(54) SPEECH PROCESSING METHOD AND APPARATUS (71) Applicant: Lenovo (Beijing) Limited, Beijing (CN)

(72) Inventors: Yinping Zhang, Beijing (CN); Chenyu Zhang, Beijing (CN); Lili Guo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 478 days.

(21) Appl. No.: 17/654,270

(22) Filed: Mar. 10, 2022

(65) Prior Publication Data

US 2022/0399012 A1 Dec. 15, 2022

(30) Foreign Application Priority Data

Jun. 10, 2021 (CN) .......................... 202110645953.3

(51) Int. Cl.
*G10L 15/22* (2006.01)
*G10L 15/05* (2013.01)
*G10L 15/06* (2013.01)
*G10L 15/16* (2006.01)
*G10L 15/18* (2013.01)
*G10L 15/08* (2006.01)

(52) U.S. Cl.
CPC .......... *G10L 15/1815* (2013.01); *G10L 15/05* (2013.01); *G10L 15/063* (2013.01); *G10L 15/16* (2013.01); *G10L 15/22* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 10,482,879 | B2 * | 11/2019 | Tang ........................ | G10L 15/02 |
| 11,342,003 | B1 * | 5/2022 | Siagian .................. | G11B 27/28 |
| 2004/0193406 | A1 * | 9/2004 | Yamato ................... | G10L 25/78 |
| | | | | 704/207 |
| 2007/0265839 | A1 * | 11/2007 | Sasaki ................... | G10L 21/045 |
| | | | | 704/201 |
| 2009/0103896 | A1 * | 4/2009 | Harrington ............. | G10L 25/78 |
| | | | | 386/239 |
| 2010/0228548 | A1 * | 9/2010 | Liu ....................... | G10L 15/065 |
| | | | | 704/E15.001 |
| 2013/0054236 | A1 * | 2/2013 | Garcia Martinez ..... | G10L 25/78 |
| | | | | 704/E15.039 |
| 2014/0195227 | A1 * | 7/2014 | Rudzicz ................ | G10L 21/003 |
| | | | | 704/231 |

(Continued)

*Primary Examiner* — Neeraj Sharma (74) *Attorney, Agent, or Firm* — ANOVA LAW GROUP, PLLC (57) ABSTRACT

A speech processing method includes obtaining first speech information from a user, determining one or more similar speech segments in the first speech information and deleting one or more similar frames each of the one or more similar speech segments to obtain second speech information, and analyzing the second speech information to determine a user intent corresponding to the first speech information. A duration of the first speech information exceeds a preset analysis duration threshold, and a duration of the second speech information does not exceed the preset analysis duration threshold.

18 Claims, 3 Drawing Sheets

(56) References Cited

U.S. PATENT DOCUMENTS

| | | | |
|---|---|---|---|
| 2015/0058013 A1* | 2/2015 | Pakhomov | G10L 25/87 704/243 |
| 2018/0039888 A1* | 2/2018 | Ge | G10L 17/04 |
| 2020/0349927 A1* | 11/2020 | Stoimenov | G10L 17/24 |
| 2022/0076023 A1* | 3/2022 | Shin | G06F 18/231 |
| 2023/0178080 A1* | 6/2023 | Min | G10L 15/1822 704/200 |

* cited by examiner

SPEECH PROCESSING METHOD AND APPARATUS

CROSS-REFERENCE TO RELATED DISCLOSURE

This application claims priority to Chinese Patent Application No. 202110645953.3, entitled "A Speech Processing Method and Apparatus", filed on Jun. 10, 2021, the entire content of which is incorporated herein by reference.

TECHNICAL FIELD

The present disclosure relates to the technical field of signal processing, and in particular, to a speech processing method and an apparatus.

BACKGROUND

When using a binary classification method to train a wake-up word model, a training window length needs to be set. When the trained wake-up word model detects the wake-up word within the training window length, it can wake up an electronic apparatus. However, in actual usage scenarios, different users have different speech rates and speaking habits. There may be situations where speech can be very slow or there can be a long pause when speaking, causing a wake-up word not to be spoken out within a training window, which in turn renders failure of a wake-up word model for waking up the electronic device.

SUMMARY

According to one aspect of the present disclosure, a speech processing method may be provided. The method includes obtaining first speech information from a user, determining one or more similar speech segments in the first speech information and deleting one or more similar frames each of the one or more similar speech segments to obtain second speech information, and analyzing the second speech information to determine a user intent corresponding to the first speech information. A duration of the first speech information exceeds a preset analysis duration threshold, and a duration of the second speech information does not exceed the preset analysis duration threshold.

According to another aspect of the present disclosure, a speech processing apparatus may be provided. The speech processing apparatus includes an acquisition module configured to obtain first speech information from a user, a determination module configured to determine one or more similar speech segments in the first speech information and delete one or more similar frames in the one or more similar speech segments to obtain second speech information, and an analysis module configured to analyze the second speech information to determine a user intent corresponding to the first speech information. A duration of the first speech information exceeds a preset analysis duration threshold, and a duration of the second speech information does not exceed the preset analysis duration threshold.

According to further aspect of the present disclosure, an electronic device may be provided. The electronic device includes a memory for storing program and a processing for executing the program stored in the memory to obtain first speech information from a user, determine one or more similar speech segments in the first speech information and deleting one or more similar frames each of the one or more similar speech segments to obtain second speech information, and analyze the second speech information to determine a user intent corresponding to the first speech information. A duration of the first speech information exceeds a preset analysis duration threshold, and a duration of the second speech information does not exceed the preset analysis duration threshold.

BRIEF DESCRIPTION OF THE DRAWINGS

The above and other objectives, features and advantages of exemplary embodiments of the present disclosure will become readily understood by reading the following detailed description with reference to the accompanying drawings. In the accompanying drawings, several embodiments of the present disclosure are shown by way of example without limitation. In the drawings, the same or corresponding reference numerals denote the same or corresponding parts.

DETAILED DESCRIPTION OF THE EMBODIMENTS

In order to make the objectives, features and advantages of the present disclosure more apparent and understandable, the technical solutions in the embodiments of the present disclosure will be clearly and completely described below with reference to the accompanying drawings in the embodiments of the present disclosure. Apparently, the described embodiments are only some of the embodiments of the present disclosure, but not all of the embodiments. Based on the embodiments of the present disclosure, all other embodiments obtained by those skilled in the art without creative efforts shall fall within the scope of the disclosure.

Figure 1:
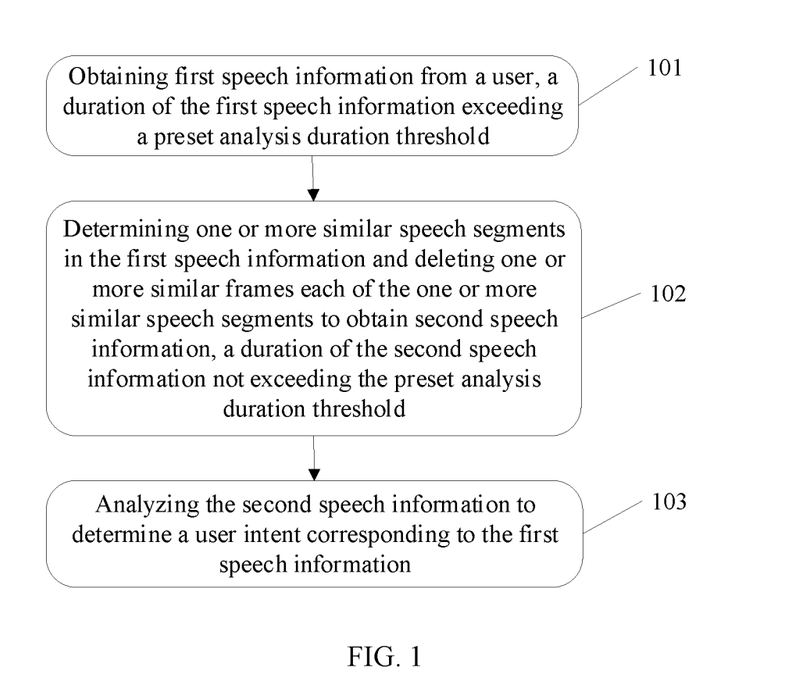
FIG. 1 is a schematic flowchart of an implementation of a speech processing method according to an embodiment of the present disclosure.

FIG. 1 is a schematic flowchart of an implementation of a speech processing method according to an embodiment of the present disclosure.

Referring to FIG. 1, a first aspect of the present disclosure provides a speech processing method. The method may include: step 101, obtaining first speech information from a user, where a duration of the first speech information exceeds a preset analysis duration threshold; step 102, determining similar speech segments in the first speech information, deleting similar frames in the similar speech segments to obtain second speech information, where the duration of the second speech information does not exceed the preset analysis duration threshold; and step 103, performing analysis on the second speech information to determine a user intent corresponding to the first speech information.

According to the speech processing method provided by the present disclosure, the first speech information whose duration exceeds the preset analysis duration threshold may be deleted to delete the similar frames having similarities in the first speech information to obtain second speech information whose speech duration satisfies the preset analysis duration threshold. Then the speech analysis may be performed on the second speech information to determine the user intent corresponding to the first speech information. The preset analysis duration threshold can be determined according to an analysis duration window used for speech analysis, that is, the preset analysis duration threshold does not exceed the analysis duration window used for speech analysis.

By applying this method, when the device obtains the first speech information provided by the user, an apparatus can analyze the speech information whose duration exceeds the preset analysis duration threshold by using the analysis duration window whose duration does not exceed the preset analysis duration threshold. By applying the method, the user does not need to control the speaking speed when providing the first speech information, so that the user can have more freedom in speech input, which improves the user's speech input experience and the success rate and accuracy of the speech analysis. For example, by applying this method, without adjusting the analysis time window, the speech information that exceeds the preset analysis time threshold can be identified, which is suitable for slow talking users.

In step 101 of the above method, the apparatus may obtain the first speech information by collecting a sound by a sound receiving device, for example, collecting the sound through a microphone. The apparatus may also be communicatively connected with other devices, and obtain the first speech information by receiving transmission information from other devices. For example, when the apparatus is a server, it may receive the first speech information sent from a mobile phone. In one instance, the duration of the first speech information may exceed a preset analysis duration threshold. For example, the speech analysis may be performed by a speech analysis model, the analysis time window corresponding to the input speech of the speech analysis model may be 2 seconds, and the first speech information may be greater than 2 seconds. Specifically, based on needs, the first speech information may be preset to any value between 2 seconds to 3 seconds or 2 seconds to 4 seconds.

It can be understood that the duration of the first speech information may not exceed the preset analysis duration threshold, and when the duration of the first speech information does not exceed the preset analysis duration threshold, the speech analysis can be performed directly on the first speech information to determine the user intent.

In step 102 of the above method, similar speech segments in the first speech information can be determined by comparing frames containing speech in the first speech information, and the similar speech segments may include a plurality of frames containing speech whose similarities satisfy preset similarities. For example, in one similar speech segment, if the similarities between any two frames containing speech may exceeds the preset similarities such as the similarities between any two frames containing speech exceed 80%, the frames containing speech in the similar speech segments are similar frames. It should be noted that, when there is no speech segment of the user's speech in the first speech information, the speech segments without the user's speech may also be determined as similar speech segments.

It can be understood that, if the first speech information carries the user intent, there can be at least one similar speech segment in the first speech information. Usually, there can be multiple similar speech segments. After determining similar speech segments, similar frames in each similar speech segment may be deleted according to certain ratio and standard. The deletion standard can be random deletion, or the frames containing speech whose similarities exceed a preset similarity degree may be deleted. The similarity degree can be set according to a corresponding preset deletion ratio. For example, in one similar speech segment, the similarities between any two frames containing speech may exceeds the preset deletion ratio. If the similarities between multiple frames containing speech in the one similar speech segment exceed 90%, only one frame or a few frames can be retained, and other similar frames with more than 90% similarities may be deleted. A deletion ratio of the frames containing speech can be determined according to the duration of the first speech information and the required duration of the second speech information. The deletion can be multiple, or the deletion can be completed at one time. Under the condition that the duration of the speech information after deletion does not exceed the preset analysis duration threshold, the speech information after deletion may be determined as the second speech information. If the speech information after deletion still exceeds the preset analysis duration threshold, the deletion may be continued.

In step 103 of the above method, the user intent corresponding to the first speech information can be determined by performing speech analysis on the second speech information. The speech analysis can be achieved through the speech analysis module. The user intent includes, but is not limited to, speech wake-up operations, speech control operations, etc. as required, including but not limited to unlocking the apparatus, locking the apparatus, switching modes, adjusting parameters, and the like.

Figure 2:
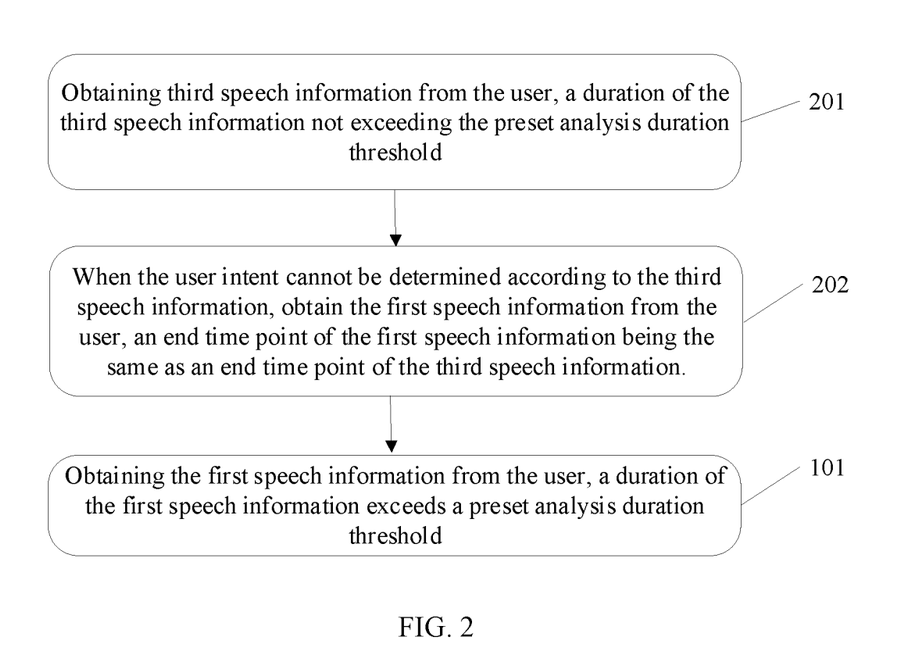
FIG. 2 is a schematic flowchart of the implementation of the speech processing method according to another embodiment of the present disclosure.

FIG. 2 is a schematic flowchart of an implementation of the speech processing method according to another embodiment of the present disclosure.

Referring to FIG. 2, in a possible implementation manner, before obtaining the first speech information from the user in step 101, the method may further include: step 201, obtaining third speech information from the user, where a duration of the third speech information does not exceed the preset analysis duration threshold; in step 202, when the user intent cannot be determined according to the third speech information, the first speech information may be obtained from the user, where an end time point of the first speech information is not the same as an end time point of the third speech information.

It can be understood that when different users input speech, the speed of the user's speech can be different according to the user's personal speaking habits. Some user may complete a specific speech within the preset analysis duration threshold, while some other users may complete the specific speech beyond the preset analysis duration threshold. There is no need to delete similar frames, if the user can complete the specific speech within the preset analysis duration threshold. The speech information from the user can be directly analyzed. If the user cannot complete the specific speech within the preset analysis duration threshold, it is necessary to obtain a portion of the speech information that exceeds the preset analysis duration threshold, and similar frames in the portion of the speech information that exceeds the preset analysis duration threshold may be deleted to obtain the other portion of the speech information that satisfies the preset analysis duration threshold.

Accordingly, before step 101, step 201 may be first executed to intercept the user's input speech by using a duration window that satisfies the preset analysis duration threshold to obtain the third speech information, so that the duration of the third speech information does not exceed the preset analysis duration threshold. Set the analysis time threshold. The end time point corresponding to the third speech information is the same as the time point when the apparatus intercepts the input speech of the user.

In step 202, when the user intent cannot be determined based on the third speech information, that is, it is determined that the third speech information cannot provide sufficient information for analysis to obtain the user intent. Accordingly, the user's speech in a longer duration needs to be acquired for analysis to obtain the user intent. The first speech information from the user may be obtained according to the third speech information. The duration of the first speech information may be preset, based on needs, to be 1.1 times, 1.2 times, 1.3 times, etc., of the third speech information, which will not be described in detail herein again. It should be noted that, to ensure the timeliness of the speech analysis, the end time point of the first speech information is the same as the end time point of the third speech information. In this way, the user's speech information closest to a current moment can be collected to understand the user intent. For example, the obtained third speech information may be a "live word", and when it is determined that the third speech information cannot provide sufficient information to analyze and obtain the user intent, the first speech information "wake-up word" may be obtained for analysis to determine the user intent.

Figure 3:
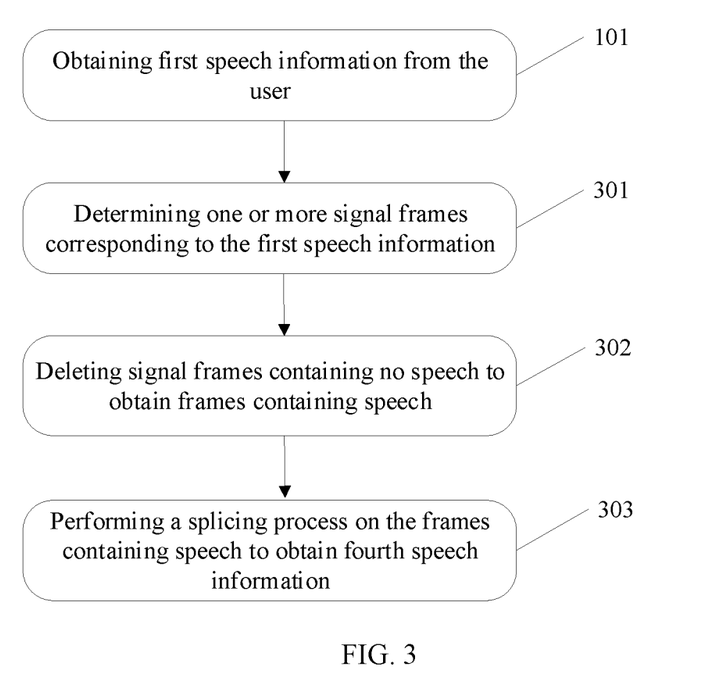
FIG. 3 is a schematic flowchart of the implementation of the speech processing method according to another embodiment of the present disclosure.

FIG. 3 is a schematic flowchart of an implementation of the speech processing method according to another embodiment of the present disclosure.

Referring to FIG. 3, in a possible implementation manner, after obtaining the first speech information from the user in step 101, the method may further include: step 301, determining one or more signal frames corresponding to the first speech information; step 302, deleting signal frames containing no speech to obtain frames containing speech; in step 303, performing a splicing process on the frames containing speech to obtain fourth speech information.

To improve the processing efficiency of the apparatus, according to the method of the embodiments of the present disclosure, the signal frames of the first speech information that have no speech may be deleted first, and the similar frames in the similar speech segments may be deleted according to a ratio. Specifically, according to the above method, the signal frames corresponding to the first speech information may be determined first. Then the signal frames may be analyzed to determine the signal frames containing no speech, and the signal frames containing no speech may be completely deleted to obtain the frames containing speech. Finally, a splicing process may be performed on the frames containing speech to obtain the fourth speech information. It can be understood that, after deleting the signal frames containing no speech, a duration of the fourth speech information can be shorter than the duration of the first speech information. If the first speech information is analyzed and it is determined that the signal frames of the first speech information all contain speech, the similar frames of the first speech information can be deleted according to a ratio.

In a possible implementation manner, after obtaining the fourth speech information in step 303, the method may further include, when the duration of the fourth speech information does not exceed the preset analysis duration threshold, analyzing the fourth speech information to determine the user intent corresponding to the first speech information.

After obtaining the fourth speech information, it is necessary to determine whether the duration of the fourth speech information exceeds the preset analysis duration threshold. When the duration of the fourth speech information does not exceed the preset analysis duration threshold, speech analysis may be performed directly on the fourth speech information to determine the user intent corresponding to the first speech information. Specifically, the speech analysis model may be used to analyze the fourth speech information.

Based on different application scenarios, the speech analysis model can use a two-class model or a multi-classification model. For example, when the user intent is to determine speech wake-up, the two-class model may be selected as the speech analysis model, and the two-class model may be trained by wake-up word training samples to obtain a wake-up word classification model, which can be used to determine whether the speech information is a wake-up word. When the first speech information is a wake-up word, the corresponding apparatus may be unlocked. When the user intent is to determine a certain operation instruction of the user intent among multiple operation instructions, the multi-classification model may be selected as the speech analysis model, and the multi-classification model may be trained by speech sample training corresponding to the multiple operation instructions to obtain an instruction classification model for determining the operation instructions of the user intent.

In some embodiments, the method may further include, when the duration of the fourth speech information exceeds the preset analysis duration threshold, determining similar speech segments in the fourth speech information, deleting similar frames in the similar speech segments, to obtain the second speech information.

If it is determined that the duration of the fourth speech information exceeds the preset analysis duration threshold, the preset analysis duration window cannot analyze the fourth speech information, and the fourth speech information needs to be deleted to obtain the second speech information that satisfies the preset analysis duration threshold. Specifically, the deletion of the fourth speech information can be implemented by determining similar speech segments in the fourth speech information, and deleting similar frames in the similar speech segments.

According to the method in the embodiments of the present disclosure, multiple gradient deletion standard values can be preset, and similar frames in similar speech segments may be deleted for multiple times based on gradients from high to low until the speech segment after deletion can satisfy the preset analysis duration threshold. For example, if the gradient of the deletion standard value is 99%, 98%, 97% . . . , then the similar frames with a similarity degree of 99% according to a specific ratio may be deleted. If the speech duration after deletion exceeds the analysis duration window, similar frames with a similarity degree of 98% may be deleted according to a specific proportion, and so on, until the speech duration after deletion does not exceed the analysis duration window.

For example, in one instance, the fourth speech information may include three similar speech segments, the durations may be 0.4 seconds, 0.6 seconds, or 0.8 seconds, respectively, for segment one, segment two, and segment three, and the preset analysis duration threshold may be 1.2 seconds. The similarity degree of similar frames in each segment may be analyzed, and similar frames having a similarity degree of 95% may be deleted according to a ratio. For example, there may be 50% of similar frames of segment one having a similarity degree of 95%, there may be 20% of similar frames of segment two having a similarity degree of 95%, and there may be 80% of similar frames of segment three having a similarity degree of 90%, the deletion ratio may be 50%, then segment one may be deleted by 0.4×0.5×0.5=0.1 seconds, and segment two may be deleted by 0.6×0.2×0.5=0.06 seconds, and segment three may be deleted by 0.8×0.8×0.5=0.32 seconds. Segment one may be 0.3 seconds after deletion, segment two may be 0.054 seconds after deletion, and segment three may be 0.48 seconds after deletion, and the speech duration after deletion is still greater than 1.2 seconds. At this time, the similar frames having a similarity degree of 92% may be deleted according to a ratio, and so on, until the speech duration after deletion is less than or equal to 1.2 seconds.

In a possible implementation manner, determining the similar speech segments in the first speech information may include determining one or more frames containing speech corresponding to the first speech information, performing a frame-to-frame similarity analysis on the one or more frames containing speech, and determining similar speech segments according to the one or more frames containing speech that satisfy the similarity degree.

The similarity of degree of the frames containing speech in the similar speech segments can be determined by analyzing the similarity between the frames containing speech. Different from the above-mentioned deletion standard value, the similarity degree standard may be used to distinguish whether the speech segments are similar speech segments. It can be understood that the similarity degree for distinguishing similar speech segments is lower than the deletion ratio for determining whether to delete the speech frames. The similarity standard can be 70%, 75%, 80% and other values based on needs, which will not be repeated herein.

In some embodiments, deleting similar frames in the similar speech segments to obtain the second speech information may include determining a corresponding deletion ratio according to the duration of the first speech information and the preset analysis duration threshold, and deleting similar speech segments according to the deletion ratio to obtain fifth speech information.

According to the duration of the first speech information and the preset analysis duration threshold, the duration of the speech to be deleted can be determined, and the method can determine the deletion ratio of similar frames in each similar speech segment according to the duration of the speech to be deleted.

For example, in one instance, the first speech information may contain three similar speech segments, and their durations may be 0.4 seconds for segment one, 0.6 seconds for segment two, and 0.8 seconds for segment three. The preset analysis duration threshold may be 1.2 seconds. It may be necessary to delete 0.6 seconds of the first speech information. Based on the above method, similar speech segments can be deleted according to the duration ratio, that is, segment one may be deleted by 0.1 seconds, segment two may be deleted by 0.2 seconds, and segment three may be deleted by 0.3 seconds.

In another instance, based on this method, similar speech segments can also be deleted according to a segment ratio, that is, each segment may be deleted by 0.2 seconds. It can be understood that similar frames of the fourth speech information can also be deleted by using the above method.

In some embodiments, after obtaining the fifth speech information, the method may further include performing smoothing processing on the fifth speech information to obtain the second speech information.

Due to the deletion of similar frames, the fifth speech information obtained by splicing may lead to the situation that the pronunciation is difficult to distinguish. Based on this, in the method according to the embodiments of the present disclosure, smooth processing may be performed on the fifth speech information, so that the speech information after the similar frames are deleted can be closer to the user's speech, which is favorable to subsequent speech analysis.

In a possible implementation manner, analyzing the second speech information to determine the user intent corresponding to the first speech information may include analyzing the second speech information through a wake-up word model to determine whether the first speech information is used to wake up an electronic apparatus. The wake-up word model can be obtained by training a wake-up word speech sample set through a neural network. The duration of each wake-up word speech in the wake-up word sample set does not exceed the preset analysis duration threshold.

In the method according to the embodiments of the present disclosure, a neural network model may be used to analyze the speech. Specifically, when the first speech information is used to determine whether the speech information wakes up a specific electronic device, the neural network training may be performed on the two-class model using the wake-up word speech sample set, to obtain the wake-up word model for distinguishing whether the first speech information is a wake-up word. It can be understood that the duration of the input duration window corresponding to the wake word model of this method may correspond to the preset analysis duration threshold, that is, the input duration window corresponding to the wake word model is consistent with the preset analysis duration threshold.

Figure 4:
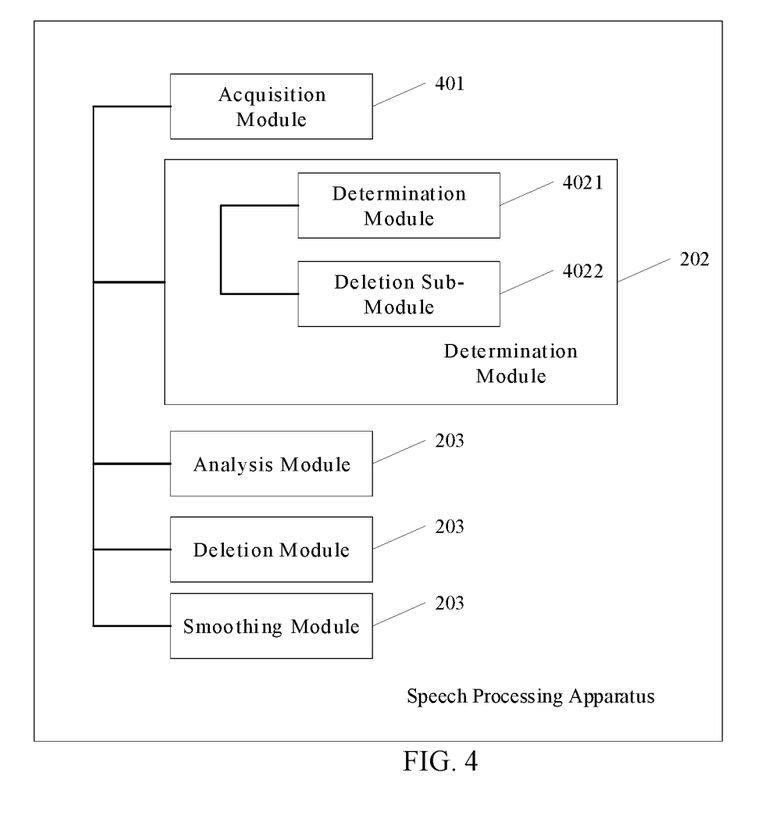
FIG. 4 is a schematic diagram of an implementation module of a speech processing apparatus according to an embodiment of the present disclosure.

FIG. 4 is a schematic diagram of an implementation module of a speech processing apparatus according to an embodiment of the present disclosure.

Referring to FIG. 4, according to a second aspect of the present disclosure, speech processing apparatus may be provided. The apparatus may include: an acquisition module 401, configured to obtain first speech information from a user, where a duration of the first speech information exceeds a preset analysis duration threshold; a determination module 402, configured to determine similar speech segments in the first speech information, delete similar frames in the similar speech segments to obtain the second speech information, where a duration of the second speech information does not exceed the preset analysis duration threshold; and an analysis module 403, configured to analyze the second speech information to determine a user intent corresponding to the first speech information.

In a possible implementation manner, the acquisition module 401 is further configured to obtain a third speech information from the user, and a duration of the third speech information does not exceed the preset analysis duration threshold. The acquisition module 401 is further configured to, when a user intent cannot be determined according to the third speech information, obtain the first speech information from the user. An end time point of the first speech information is the same as an end time point of the third speech information.

In a possible implementation manner, the determination module 402 is further configured to determine signal frames corresponding to the first speech information. The apparatus may further include a deletion module 404 configured to delete signal frames not containing speech to obtain frames containing speech, and a splicing module configured to perform splicing on the frames containing speech to obtain fourth speech information.

In a possible implementation manner, the analysis module 403 may be further configured to analyze the fourth speech information when a duration of the fourth speech information does not exceed the preset analysis duration threshold, to determine the user intent corresponding to the first speech information.

In a possible implementation manner, the determination module 402 may be configured to, when the duration of the fourth speech information exceeds the preset analysis duration threshold, determine similar speech segments in the fourth speech information, and delete similar frames in the similar speech segments to obtain the second speech information.

In a possible implementation manner, the determination module 402 may be further configured to determine one or more frames containing speech corresponding to the first speech information, perform frame-to-frame similarity analysis on the frames containing speech, and determine similar speech segments according to the frames containing speech that satisfy the similarity standard.

In a possible implementation manner, the determination module 402 may include a determination sub-module 4021 configured to determine a corresponding deletion ratio according to the duration of the first speech information and the preset analysis duration threshold and a deletion sub-module 4022 configured to delete, according to the deletion ratio, similar speech segments to obtain fifth speech information.

In some embodiments, the apparatus may further include a smoothing module 405, configured to perform smoothing processing on the fifth speech information to obtain the second speech information.

In a possible implementation manner, the analysis module 403 may be configured to analyze the second speech information by using the wake-up word model to determine whether the first speech information is used to wake up an electronic apparatus. The wake-up word model is obtained by neutral network training through the wake-up word speech sample set. A duration of each wake-up word speech in the wake-up word sample set does not exceed the preset analysis duration threshold.

According to a third aspect of the present disclosure, an electronic device may be provided. The electronic device may include a processor, a communication interface, a memory, and a communication bus. The processor, the communication interface, and the memory may communicate with each other through the communication bus. The memory is configured to store computer programs, and the processor is configured to execute programs stored in the memory to implement the speech processing method provided by the first aspect of the present disclosure.

According to a fourth aspect of the present disclosure, a non-transitory computer-readable storage medium may be provided. The computer program is stored in the computer-readable storage medium, and when the computer program is executed by a processor, the speech processing method provided in the first aspect of the present disclosure can be implemented.

In the description of the present disclosure, description with reference to the terms "one embodiment," "some embodiments," "example," "specific example," or "some examples," etc., mean specific features, structure, material or features described in connection with the embodiments or instances may be included in at least one embodiment or example. Furthermore, the particular features, structures, materials or characteristics described may be combined in any suitable manner in any one or more embodiments or examples. Furthermore, those skilled in the art may combine and combine different embodiments or examples described in the present disclosure, as well as the features of the different embodiments or examples, without conflicting each other.

In addition, the terms "first" and "second" may be only used for descriptive purposes, and should not be construed as indicating or implying relative importance or implying the number of indicated technical features. Thus, a feature labeled with "first", "second" may expressly or implicitly include at least one such feature. In the description of the present disclosure, "plurality" means two or more, unless otherwise expressly and specifically defined.

The above are only specific embodiments of the disclosure, but the protection scope of the disclosure is not limited to this. Any person skilled in the art who is familiar with the technical scope disclosed in the present disclosure can easily think of changes or replacements, which should cover within the protection scope of the disclosure. Therefore, the protection scope of the disclosure shall be subject to the protection scope of the accompanying claims.

What is claimed is:

1. A speech processing method, comprising:
   obtaining first speech information from a user, wherein a duration of the first speech information exceeds a preset analysis duration threshold;
   determining one or more similar speech segments in the first speech information and deleting one or more similar frames in the one or more similar speech segments to obtain second speech information, wherein a duration of the second speech information does not exceed the preset analysis duration threshold, and deleting the one or more similar frames in the one or more similar speech segments to obtain the second speech information comprises:
      determining, according to the duration of the first speech information and the preset analysis duration threshold, a deletion ratio; and
      deleting, according to the deletion ratio, the one or more similar frames in the one or more similar speech segments to obtain the second speech information; and
   analyzing the second speech information to determine a user intent corresponding to the first speech information.

2. The method according to claim 1, wherein before obtaining the first speech information from the user, the method further comprises:
   obtaining third speech information from the user, wherein a duration of the third speech information does not exceed the preset analysis duration threshold; and
   in response to the user intent not being determinable according to the third speech information, obtaining the first speech information from the user,
   wherein an end time point of the first speech information is the same as an end time point of the third speech information.

3. The method according to claim 1, wherein after obtaining the first speech information from the user, the method further comprises:
   determining a plurality of signal frames corresponding to the first speech information;
   deleting one or more signal frames not containing speech to obtain one or more frames containing speech; and
   perform splicing processing on the one or more frames containing speech to obtain fourth speech information.

4. The method according to claim 3, wherein after obtaining the fourth speech information, the method further comprises:

in response to a duration of the fourth speech information not exceeding the preset analysis duration threshold, analyzing the fourth speech information to determine the user intent corresponding to the first speech information.

5. The method of claim 4, further comprising:
in response to the duration of the fourth speech information exceeding the preset analysis duration threshold, determining one or more similar speech segments in the fourth speech information, and deleting one or more similar frames in the similar speech segments to obtain second speech information.

6. The method according to claim 1, wherein determining one or more similar speech segments in the first speech information comprises:
determining one or more frames containing speech corresponding to the first speech information, performing a frame-to-frame similarity analysis to the one or more frames containing speech, and determining one or more similar speech segments according to the one or more frames containing speech that satisfy a similarity standard.

7. The method according to claim 1,
wherein deleting, according to the deletion ratio, the one or more similar frames in the one or more similar speech segments to obtain the second speech information includes deleting, according to the deletion ratio, the one or more similar frames in the one or more similar speech segments to obtain fifth speech information,
the method further comprising:
performing smoothing on the fifth speech information to obtain the second speech information.

8. The method according to claim 1, wherein analyzing the second speech information to determine the user intent corresponding to the first speech information comprises:
analyzing the second speech information through a wake-up word model to determine whether the first speech information is used to wake up an electronic apparatus, wherein the wake-up word model is obtained by training a wake-up word speech sample set through a neural network, and a duration of each wake-up word speech in the wake-up word sample set does not exceed the preset analysis duration threshold.

9. A speech processing apparatus, comprising:
an acquisition module configured to obtain first speech information from a user, wherein a duration of the first speech information exceeds a preset analysis duration threshold;
a determination module configured to determine one or more similar speech segments in the first speech information and delete one or more similar frames in the one or more similar speech segments to obtain second speech information, wherein a duration of the second speech information does not exceed the preset analysis duration threshold, and the determination module comprises:
a determination sub-module configured to determine a corresponding deletion ratio according to the duration of the first speech information and the preset analysis duration threshold; and
a deletion sub-module configured to delete, according to the deletion ratio, the one or more similar frames in the one or more similar speech segments to obtain the second speech information; and
an analysis module configured to analyze the second speech information to determine a user intent corresponding to the first speech information.

10. The speech processing apparatus according to claim 9, wherein the acquisition module is further configured to obtain third speech information from the user, wherein a duration of the third speech information does not exceed the preset analysis duration threshold.

11. The speech processing apparatus according to claim 10, wherein the acquisition module is further configured to, in response to a user intent not being determinable according to the third speech information, obtain the first speech information from the user, wherein an end time point of the first speech information is the same as an end time point of the third speech information.

12. The speech processing apparatus according to claim 9, wherein the determination module is further configured to determine a plurality of signal frames corresponding to the first speech information.

13. The speech processing apparatus according to claim 12, further comprising:
a deletion module configured to delete one or more signal frames not containing speech from the plurality of signal frames to obtain one or more frames containing speech; and
a splicing module configured to perform splicing on the one or more frames containing speech to obtain fourth speech information.

14. The speech processing apparatus according to claim 13, wherein the analysis module is further configured to analyze the fourth speech information in response to a duration of the fourth speech information not exceeding the preset analysis duration threshold, to determine the user intent corresponding to the first speech information.

15. The speech processing apparatus according to claim 13, wherein the determination module is further configured to, in response to a duration of the fourth speech information exceeding the preset analysis duration threshold, determine similar speech segments in the fourth speech information and delete similar frames in the similar speech segments to obtain the second speech information.

16. The speech processing apparatus according to claim 9, wherein the determination module is further configured to determine one or more frames containing speech corresponding to the first speech information, perform frame-to-frame similarity analysis on the frames containing speech, and determine one or more similar speech segments according to the one or more frames containing speech that satisfy a preset similarity degree.

17. The speech processing apparatus according to claim 9, wherein the deletion sub-module is configured to delete, according to the deletion ratio, the one or more similar frames in the one or more similar speech segments to obtain fifth speech information,
the speech processing apparatus further comprising:
a smoothing module configured to perform smoothing processing on the fifth speech information to obtain the second speech information.

18. An electronic device, comprising:
a memory for storing program; and
a processing for executing the program stored in the memory to:
obtain first speech information from a user, wherein a duration of the first speech information exceeds a preset analysis duration threshold;
determine one or more similar speech segments in the first speech information and delete one or more similar frames in the one or more similar speech segments to obtain second speech information, wherein a duration of the second speech information does not exceed the preset analysis duration threshold, and deleting the one or more similar frames in the one or more similar speech segments to obtain the second speech information comprises:
determining, according to the duration of the first speech information and the preset analysis duration threshold, a deletion ratio; and
deleting, according to the deletion ratio, the one or more similar frames in the one or more similar speech segments to obtain the second speech information; and
analyze the second speech information to determine a user intent corresponding to the first speech information.

\* \* \* \* \*